July 22, 1969     F. VISCONTI     3,456,902
WINGLESS VTOL AIRCRAFT
Filed Nov. 27, 1967
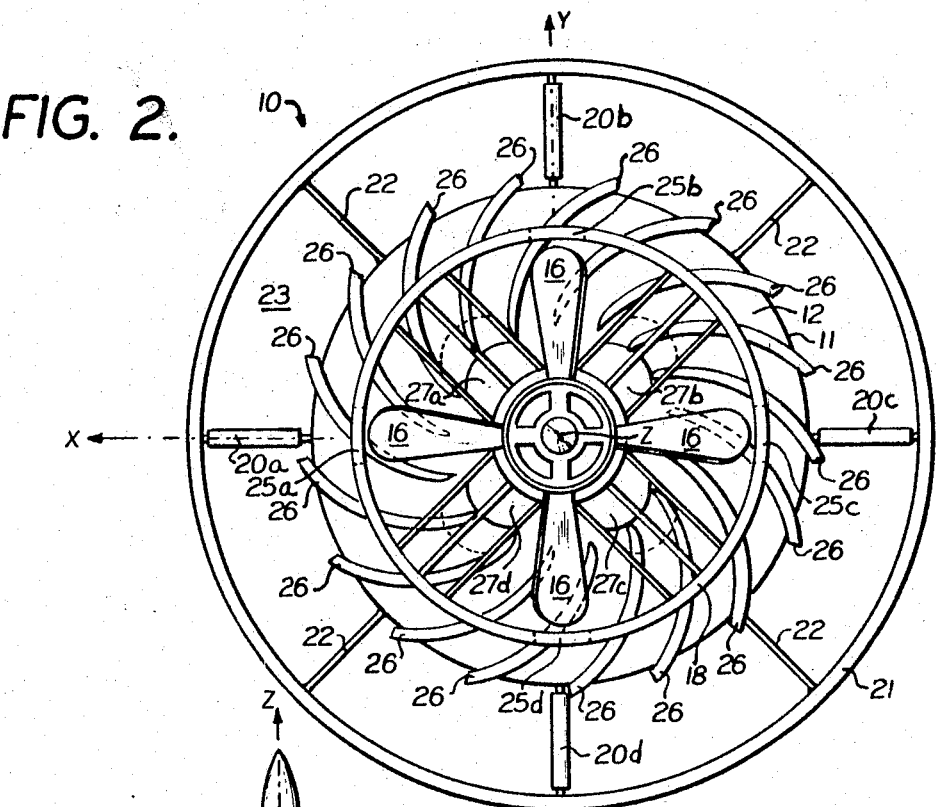
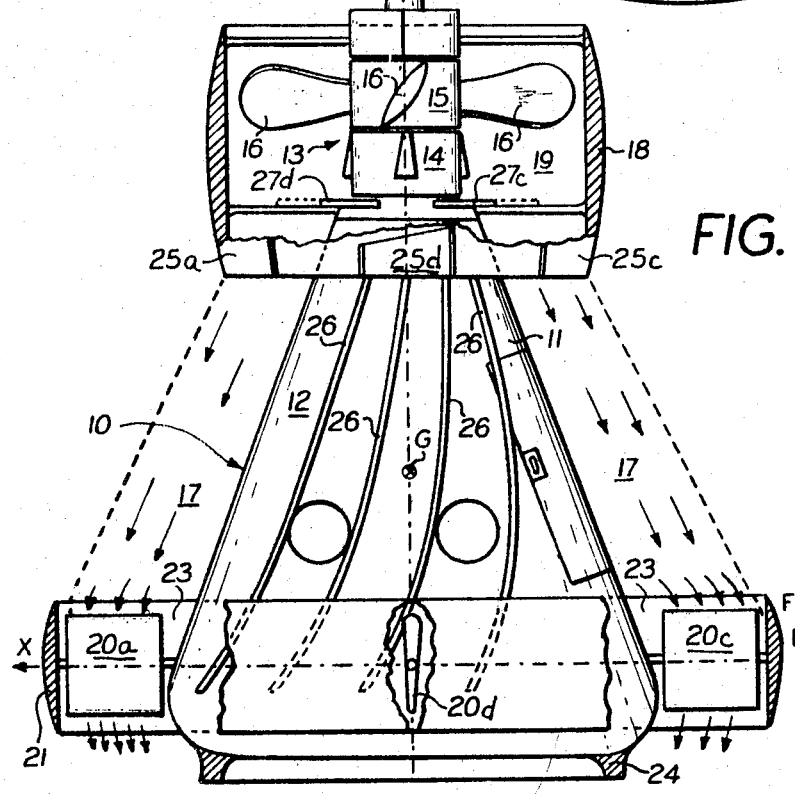
INVENTOR
FIORAVANTE VISCONTI
BY
Andrew J. French
ATTORNEY.

United States Patent Office 3,456,902
Patented July 22, 1969

3,456,902
WINGLESS VTOL AIRCRAFT
Fioravante Visconti, 188 Floral Ave.,
Plainview, N.Y. 11803
Filed Nov. 27, 1967, Ser. No. 685,908
Int. Cl. B64c 29/00, 27/22
U.S. Cl. 244—23                                      7 Claims

ABSTRACT OF THE DISCLOSURE

A wingless aircraft capable of vertical take-off and landing (VTOL) and propelled by thrust forces created by a fluid accelerator type propulsion means mounted to the upper end portion of a symmetrical upright cabin body. The propulsion means is arranged to discharge high velocity air for flow downwardly along the cabin body surface in an airstream of limited thickness exiting at the lower end portion of the cabin body. Control over the aircraft movements in both translation and body axes rotation is effected by adjustable control surfaces which extend outward from the cabin body into the high velocity airstream, and which accordingly are highly effective without any assistance from relative wind forces due to aircraft motion.

Background and summary of invention

The present invention relates in general to wingless aircraft having vertical take-off and landing capabilities (VTOL) and more particularly to a VTOL aircraft which is propelled by thrust forces created by a fluid accelerator type powerplant mounted to the upper end portion of an upright, symmetrical cabin body. In the course of its operation, the powerplant establishes a high velocity airstream flowing downwardly along the exterior surface of the cabin body and exiting at the lower end portion thereof. Control over the body axes rotations as well as the translatory motion of the aircraft is achieved by means of adjustable control surfaces which extend into the high velocity airstream for interaction therewith to exert control forces and moments upon the aircraft.

One of the basic problems in the design of conventional aircraft, and particularly in the case of VTOL aircraft is to provide sufficient control effectiveness at low airspeeds, as when taking-off, hovering, or landing, so that critical and necessary maneuvers can be executed without the need for a large increase in airspeed.

Another basic design problem is that of control handling characteristic variations with airspeed. It is commonly known in the prior art that the control stick force required to position and hold a control surface at any given deflection will vary with airspeed, roughly increasing as the square of the relative airspeed. In the case of supersonic aircraft, special and elaborate "artificial feel" systems are provided to give the pilot physically sensible control stick reaction forces which are the same at high speeds as well as low speeds for similar pitch, roll and yaw accelerations. Thus, with aircraft which must fly over a wide range of airspeeds, there are the general design problems of providing sufficient control surface effectivity at low airspeeds, providing sufficient control surface actuation forces to overcome dynamic pressure loading at high airspeeds, and providing non-confusing control stick reaction characteristics throughout the entire airspeed range.

In the case of the aircraft according to the instant invention the cabin body is sheathed by the downwardly flowing high velocity airstream layer created by the propulsion means elevated above most of, or all of the cabin body, and the control surfaces are completely immersed in this airstream. The flow velocities in such airstream layer depend primarily upon the instantaneous operating power level of the propulsion means and will generally be much higher than the highest relative airspeed condition, since the vertical component of the net thrust force due to the airstream must necessarily be equal to the total aircraft weight for constant altitude flight, and only slightly less for a controlled, safe descent. Consequently, the control surfaces will always have available a minimum airstream dynamic pressure whenever the propulsion powerplant is operating in an airborne condition, even just after lift-off, and the variation between maximum and minimum airstream dynamic pressure will be considerably less than in the case of conventional aircraft control surfaces.

Where the net thrust vector is tilted up to a maximum angle of 30° from the vertical, its magnitude will be $\frac{2}{3}\sqrt{3}$ times the aircraft weight in order to have a vertical component equal thereto. For vertical hovering without any horizontal translation, the net thrust vector will be exactly equal to the aircraft weight.

Accordingly, it becomes possible with the aircraft configuration of the invention to use a relatively simple control stick-to-control surface actuation system, since the dynamic pressure acting upon all control surfaces varies over a relatively small percentage as compared with several hundred percent in the case of relative airspeed dependent controls.

In accordance with a preferred embodiment of the invention a ducted fan propulsion means is used to intake air from the ambient atmosphere and accelerate such air for discharge from the fan at high velocity and in an annular flow pattern substantially symmetrical with respect to the upright central axis of the cabin body. Thus, the main propulsive force is a thrust which is directed upwardly parallel to the cabin central axis, and is applied to the powerplant itself, or more specifically to the rotatable impeller thereof, and transmitted to the cabin body through the powerplant connection thereto. Consequently, the main propulsive force will, by reason of the powerplant being above most, or even all of the cabin body, be applied at a point above the aircraft center of gravity, thereby rendering the aircraft inherently stable for all tilt attitudes.

Horizontal motion, either at constant altitude or in combination with either upward or downward vertical motion is achieved by tilting the entire aircraft until the horizontal component of the net propulsive thrust conforms in magnitude and direction to the desired flight path. Such tilting of the aircraft is achieved by manipulating adjustable control surfaces which can be supported either by the cabin body, or the power plant structure itself, and which extend into the high velocity airflow discharged from the powerplant.

In accordance with the invention, the powerplant discharge airflow, or downwash, is directed to flow downwardly along the exterior surface of the cabin body in a concentrated high velocity airstream of limited thickness, by means such as an annular shroud disposed in laterally surrounding relation to the powerplant impeller, and in laterally surrounding spaced-apart relation to the upper end portion of the cabin body to define therewith a corresponding annular exhaust duct through which such downwash flows. It should be noted that the powerplant is not necessarily restricted to a ducted fan, but in general can be any fluid-accelerator means which will provide a high velocity gas or air flow directed downwardly along the cabin body surface, in which case, the shroud and upper cabin body portion would define the exhaust duct for discharging high velocity gas from whatever propulsion means employed. In general, the high velocity airstream thickness will depend upon the shroud-to-cabin body spacing.

With all control surfaces in their neutral positions, such high velocity airstream will generally tend to exit the lower end portion of the cabin body without producing any appreciable further lift forces, and producing in the course of its downward flow some drag forces opposing the main propulsive thrust and generally parallel thereto because of cabin body symmetry about its central axis, which is substantially coincident with the main propulsive thrust. As a result of such drag forces there will be a net propulsive thrust force which is aligned substantially with the central axis but has an upward magnitude equal to that of the main propulsive force minus the total of such drag forces.

When the control surfaces are displaced from their neutral positions, the intensities of their respective interactions with the high velocity airstream will increase, and the dynamic pressure of the airstream will in general exert forces and moments upon the control surfaces which will tend to change the aircraft attitude in pitch, roll, yaw, either singly or in combination, depending upon the particular control surfaces displaced. In general, it can be expected, just as in the case of prior art conventional aircraft, that some loss of net propulsive thrust will be occasioned by increased drag during control surface operation.

However, the principal control surfaces provided on the aircraft of the invention are used to get the aircraft into the requisite tilt attitude for horizontal motion, which incidentally, due to the configuration afforded by the invention, can be in any horizontal direction, since the aircraft is designed to fly in a generally upright attitude, with tilting up to about a 30° maximum angle in any vertical plane. Other useful control surfaces can also be provided, such as trimmers to compensate for propulsion system reaction torques, gyroscopic effects and the like.

It is therefore, an object of the invention to provide an aircraft which is capable of vertical take-off and landing maneuvers.

Another object of the invention is to provide an aircraft which has a high control effectivity at low relative airspeeds.

A further object of the invention is to provide an aircraft as aforesaid having control surfaces which operate in a high velocity airstream created by the powerplant for high effectivity without assistance from relative wind forces due to aircraft motion.

A further object of the invention is to provide an aircraft as aforesaid which has an upright cabin body symmetrical about its central axis and capable of sideways horizontal in flight motion along any selected direction.

Still another and further object of the invention is to provide an aircraft as aforesaid which is inherently stable while airborne, and also on the ground.

Other and further objects and advantages of the invention will become apparent from the following detailed description and the accompanying drawing.

Brief description of the drawing

In the drawing:

FIG. 1 is an elevation view, partly in section, of an aircraft constructed in accordance with a preferred embodiment of the invention.

FIG. 2 is a plan view of the aircraft shown in FIG. 1.

Description of the preferred embodiments of the invention

The VTOL aircraft 10 shown in FIGS. 1 and 2 has an upright cabin body 11 with an exterior surface 12 configuration symmetrical with respect to its upright central axis Z, and preferably in the form of a body of revolution, such as an inverted cone, for better stability.

At the upper end portion of cabin body 11 is mounted, for support thereby and movement therewith, a fluid accelerator type powerplant, which is expediently a ducted fan powerplant 13 that serves as the propulsion means for the aircraft 10. Ducted fan 13 has an engine 14, which can be an internal combustion type engine 14, and an impeller 15 provided with a plurality of affixed blades 16 and rotatable by engine 14 to establish a high velocity airstream 17 which flows downwardly along the cabin body surface 12 and exits at the lower end portion thereof. In addition to the impeller 15 and engine 14, the ducted fan 13 has an annular shroud 18 disposed in laterally surrounding relation to impeller 15 and in laterally surrounding spaced-apart relation to the upper portion of cabin body 11 to define therewith an annular duct 19 for the discharge of high velocity air which then flows down along cabin body surface 12 in a concentrated airstream 17 of limited thickness corresponding to the spacing between the lower edge of shroud 18 and the surface 12.

Under normal operating conditions, the ducted fan 13 takes in air from the ambient atmosphere, generally from above the aircraft 10, and such air is accelerated to a high velocity by the impeller 15 and exhausted out, still at high velocity, through the annular duct 19 in an annular flow pattern generally symmetrical with respect to the cabin body axis Z, except in certain cases where, for control purposes, the symmetry of flow is changed. Accordingly, within ducted fan 13, the air undergoes a change in momentum by reason of the action of the impeller blades 16, and a corresponding thrust force will be exerted upon the impeller 15 to lift and propel the entire aircraft 10. This is highly advantageous since with the invented frusto-conical cabin body 11 cnofiguration shown, the main propulsive force will be applied to the aircraft 10 at a point above the center of gravity G thereof, a feature which renders the aircraft 10 inherently stable about a generally vertical attitude.

The exhaust air flowing within the concentrated airstream 17 still has kinetic energy which can be utilized advantageously in accordance with the invention for control purposes to achieve attitude stabilization and to derive horizontal component propulsive forces for aircraft 10 motion along any selected horizontal path, either alone or in combination with up or down vertical motion.

To utilize the airstream 17 kinetic energy in controlling the motion and attitude of the aircraft 10, the invention provides a plurality of control surface members 20a–d supported by cabin body 11 at the lower end portion thereof, and which are rotatable relative thereto about axes transverse, and preferably perpendicular to axis Z. The control members 20a–d can be generally flat plates, or can be of airfoil cross-section, and extend into the high velocity airstream 17 for interaction therewith to create auxiliary forces and moments acting upon the aircraft 10 that shift the direction of the overall propulsive thrust and net moment acting thereupon.

To increase the effectivity of the control members 20a–d a second annular shroud 21 is supported by the cabin body 11 via struts 22 in laterally surrounding spaced-apart relation to the lower end portion of cabin body 11 and in endwise surrounding relation to control members 20a–d. The shroud 21 defines with the lower end portion of the cabin body 11 a second annular duct 23 open at its upper and lower ends and having a circumferentially uniform width at least equal to the thickness of the high velocity airstream 17 to laterally confine and guide the flow thereof past control members 20a–d to enhance their effectiveness. Shroud 21 is preferably arranged to direct the airstream 17 flow to exit from the lower end portion of cabin body 11 in a direction parallel to axis Z, except for such portion of airstream 17 flow as may be diverted by the action of control members 20a–d.

A ring 24 attached to the bottom of the cabin body 11 serves to assist in directing the exit airstream flow parallel to axis Z and also serves as a landing gear for the aircraft 10. Landing ring 24 has a height which is greater than that of the highest rock or other obstacle anticipated in the landing area, so that the bottom of cabin body 11 will not be damaged should it be necessary or desired to land in an unprepared area, such as a field or clearing in a wooded area. Ring 24, by reason of it being approximately equal to the diameter of the cabin body 11, affords a stable landing support which requires no moving parts or wheels as in conventional aircraft landing gear. Of course, if desired, auxiliary caster wheels (not shown) which can be retracted into the cabin body 11 can be provided to allow the aircraft 10 to be conveniently moved on the ground without using its powerplant.

While the control members 20a–d are sufficient to enable the aircraft 10 to execute all normal maneuvers, additional auxiliary control members and means can be provided in accordance with the invention to give the aircraft 10 a somewhat redundant control system for improved reliability, and to compensate for minor disturbing forces such as reaction torques resulting from the operation of ducted fan 13.

For example, a plurality of control vanes 25a–d can be connected to the lower end of the fan shroud 18 for pivotal movement relative thereto about axes skew with respect to axis Z. These control vanes 25a–d are preferably constructed so that when in their neutral positions as shown in FIGS. 1 and 2, they form a continuous part of shroud 18. Control vanes 25a–d are arranged for individually selective limited inward and outward pivotal movement with respect to shroud 18 and axis Z, so that they can assume positions of interaction with the flow of air discharged through duct 19 to aid in tilting the aircraft 10 and to establish a torque counterbalancing the reaction torque imposed upon the aircraft 10, or more specifically upon cabin body 11, by the rotation of impeller 15.

If desired, in conjunction with the skew axis control vanes 25a–d, or in lieu thereof, a plurality of helical vanes 26 may be provided. Helical vanes 26 are distributed in a symmetrical arrangement about cabin body 11 and supported thereby for extension from the exterior surface 12 thereof into the high velocity airstream 17 for interaction therewith to establish a torque counterbalancing the reaction torque due to impeller 15 rotation.

Control over the direction of the net propulsive thrust vector acting upon aircraft 10 can be also achieved by means of a plurality of trimmer plate members 27a–d which are supported by the upper portion of cabin body 11 and preferrably also by ducted fan 13, and selectively moveable relative thereto into positions in which they restrict the inlet air flow through the annular duct 18 associated with fan 13. This allows control over the airstream 17 flow distribution around the periphery of the cabin body 11, and hence enables adjustment of the net thrust vector orientation with respect to the aircraft center of gravity G.

When airborne, the aircraft 10 will in general experience the downward pull of gravity acting at its center of gravity G, an upward thrust acting at the impeller 15, aerodynamic forces acting upon its various control members 20a–d, vanes 25a–d, due principally to the high velocity airstream 17 and aerodynamic forces acting on the cabin body 11 due to the high velocity airstream 17, and aerodynamic forces acting upon the cabin body 11 and shrouds 18 and 21 due to the relative wind.

The invention provides a redundancy of control members which can be used for tilting the aircraft 10. For example the control members 20a–d serve as the primary flight control surfaces and can be operated to tilt the aircraft 10 in any direction with respect to the vertical, and also to spin or yaw the aircraft 10 about its axis. The control vanes 25a–d can also be used to perform the same functions as the control members 20a–d, but, in accordance with a preferred embodiment of the invention, are somewhat smaller in surface area and hence when used alone, the control vanes 25a–d are somewhat less effective than corresponding control members 20a–d, but are more useful for trimming and applying small magnitude control forces to the aircraft 10. The trimmer plates 27a–d are intended for use primarily in compensating for shifts of the center of gravity in the aircraft 10, as may normally occur due to fuel consumption and with various payload arrangements, but can be used to tilt the aircraft 10 in any selected vertical plane.

The choice of which class of control surfaces to use in effecting any given maneuver is in general left to the discretion of the pilot, or to an autopilot, if such means is provided.

With regard to the arrangement of the control surfaces, it will be noted that the control members 20a–d are arranged preferably symmetrically about the axis Z, in that the opposite pair of control members 20a and 20c are arranged to pivot about a common axis X perpendicular to axis Z, and the other opposite pair of control members 20b and 20d are arranged to pivot about a common axis Y perpendicular to both axes X and Z. Each pair of opposite control members, 20a and 20c, 20b and 20d function in a manner similar to a pair of ailerons on a conventional aircraft.

For example, the control members 20a and 20c will in general be in their neutral positions when aligned with the XZ plane, as will be the other set of control members 20b and 20d when aligned with the YZ plane. When any one of the control members 20a–d are pivotally displaced from the neutral position there will be exerted upon the aircraft 10 a spinning moment about the Z axis, and also a tilting moment about the control member 20a–d pivot axis X, or Y as the case may be. In general, the spinning moment will be used to position either the XZ plane or the YZ plane of the aircraft 10 in alignment with a selected direction of flight, although any other radial plane through the Z axis can be chosen as the forward-backward aircraft 10 body reference plane. In this respect, the aircraft 10 offers a wide variety of ways in which horizontal flight along a given flight path can be accomplished.

For example, the aircraft 10 can assume any desired body axis rotation attitude about the Z axis regardless of its tilt attitude, so that the pilot can fly the aircraft 10 facing forwards, sidewards, or even backwards with respect to the direction of flight and can even scan the complete horizon by spinning the aircraft 10 about the Z axis as it travels.

To simplify the explanation of the working of the controls, it can be assumed that the XZ plane is designated as the forward-backward reference plane for the aircraft 10 so that the control member 20a is considered as being mounted on the forwardly directed portion of the X axis, the control member 20C being mounted on the backwardly directed, or aft portion of the X axis, and the control members 20b and 20d being mounted on the starboard and port or right and left portions respectively of the Y axis. In this way, the X axis corresponds to the longitudinal body axis of a conventional winged aircraft and the Y axis corresponds to the lateral body axis thereof, which choice is more compatible with the terminology used in describing the motion of conventional aircraft. Consequently, aircraft 10 body rotations about the Z axis can be considered as yaw, and tilt angles about the Y and X axis can be considered as pitch and roll angles respectively.

To fly along a given horizontal flight path, the aircraft 10 can be yawed about the Z axis until the X axis is aligned with the flight path and then pitched downward until the required tilt angle $\theta$ below the vertical is attained. Alternatively, the aircraft 10 can be yawed until the Y axis is aligned with the flight path direction and then rolled downward until the same tilt angle $\theta$ is reached. In essence, it makes no difference as to what combination of pitch, roll and yaw maneuvers are executed to orient the aircraft 10 thrust vector horizontal component in the selected flight path direction and to attain a tilt angle which gives the desired horizontal acceleration.

To consider the effect upon the aircraft 10 produced by the deflection of the individual control members 20a–d from their neutral positions, it is expedient to use the familiar right-hand rule for describing the directions of control member 20a–d rotation about their pivot axes, and the resulting aerodynamic moments about such axes, choosing arbitrarily the upward direction of the X axis, and the rightwards direction of the Y axis as being positive.

Under such notation convention, a positive angular deflection of $+\delta$ of control member 20a produces a negative moment, $-Mx$, about the X axis, together with a negative moment, $-Mz$ about the Z axis. Likewise a similar $+\delta$ deflection of control member 20c produces a negative moment, $-Mx$ about the X axis in combination with a positive moment, $+Mz$ about the Z axis. For control members 20b and 20d, positive angular deflections $+\delta$ result in the production of negative moments, $-My$ about the Y axis in combination with a negative Z axis moment, $-Mz$, in the case of control member 20b and a positive Z axis moment, $+Mz$, in the case of control member 20d. These relations between control member 20a–d deflection and their resultant aircraft 10 body axes moments are predicated upon the conditions that the high velocity airstream flows generally downward ($-Z$ direction) and parallel to the Z axis in the region of control member impact, and that the deflection angle $\delta$ is less than 90 degrees, which it normally is under practical operating conditions. The following Table I summarizes the foregoing deflection and moment relations for both positive and negative deflections $\delta$ of control members 20a–d.

TABLE I

|  | For $+\delta$ | | | For $-\delta$ | | |
|---|---|---|---|---|---|---|
|  | Mx | My | Mz | Mx | My | Mz |
| 20a | $-Mx$ | 0 | $-Mz$ | $+Mx$ | 0 | $+Mz$ |
| 20c | $-Mx$ | 0 | $+Mz$ | $+Mx$ | 0 | $-Mz$ |
| 20b | 0 | $-My$ | $-Mz$ | 0 | $+My$ | $+Mz$ |
| 20d | 0 | $-My$ | $+Mz$ | 0 | $+My$ | $-Mz$ |

From the foregoing Table I, it can be noted that the moment produced by any of the control members 20a–d about its own pivot axis, X, Y, is opposite in sign to the direction of its deflection from neutral position. Considering the control members 20a and 20b as being located along the positive sides of the X and Y axes respectively, and the control members 20c and 20d as being located along the negative sides of the X and Y axes respectively, it can furthermore be noted that the sign of the corresponding Z axis moment produced by a deflection of magnitude $\delta$ of any control member 20a–d is opposite in sign with respect to deflection direction where the control member is located on the positive side of its pivot axis, and is of the same sign as the deflection direction where the control member is located on the negative side of its pivot axis.

Since the creation of a Z axis moment is inherent in every deflection of a control member 20a–d to create an aircraft 10 body axis moment about the control member 20a–d pivot axis X, Y, it follows that it is necessary to operate the control members 20a–d in combinations of two in order to null out the Z axis moments created by each, as will be normally desired in order to avoid continuous Z axis spinning in flight. For example, deflecting both control members 20a and 20c by angle $+\delta$ or $-\delta$, to exert a moment $-Mx$ or $+Mx$ respectively on aircraft 10 will result in a net Z axis moment of zero where the two control members 20a and 20c have equal aerodynamic moment-deflection characteristics.

Likewise, where both control members 20b and 20d are given deflection of $+\delta$ or $-\delta$ to produce moments of $-My$ or $+My$ respectively, there will be zero Z axis spin moment.

Where it is desired to exert a combination of X axes and Y axis moments, i.e. $+Mx$ with $+My$, $-Mx$ with $-My$, $+Mx$ with $-My$, or $-Mx$ with $+My$, upon the aircraft 10, it is necessary to operate the proper combination of control members 20a–d in order to avoid Z axis spin. These combinations are listed in the following Table II.

TABLE II

| Moment Combination | Control Member | | | |
|---|---|---|---|---|
|  | 20a | 20b | 20c | 20d |
| $+Mx$ and $+My$ | $-\delta$ | 0 | 0 | $-\delta$ |
|  | 0 | $-\delta$ | $-\delta$ | 0 |
| $-Mx$ and $-My$ | $+\delta$ | 0 | 0 | $+\delta$ |
|  | 0 | $+\delta$ | $+\delta$ | 0 |
| $+Mx$ and $-My$ | $-\delta$ | $+\delta$ | 0 | 0 |
|  | 0 | 0 | $-\delta$ | $+\delta$ |
| $-Mx$ and $+My$ | $+\delta$ | $-\delta$ | 0 | 0 |
|  | 0 | 0 | $+\delta$ | $-\delta$ |

From Table II it can be seen that for each X axis and Y axis moment combination, there are two available sets of paired control member 20a–d operation that will accomplish the same result.

Hence, the invention affords considerable control redundancy within the control member 20a–d subsystem itself, and actually the aircraft 10 can be maneuvered successfully along any flight path by using only one pair of control members such as either 20a and 20c, or 20b and 20d, which pivot about a common axis. Where only a single axis pair of control members 20a and 20c, or 20b and 20d is provided, the aircraft 10 can be tilted only by moments applied about such axis, but omnidirectional horizontal flight capability still remains since either axis pair of control members 20a and 20c, or 20b and 20d can be operated to spin the aircraft 10 into a selected yaw attitude and hold it there for tilting downward to accelerate horizontally, on for tilting upward and downward in the opposite direction to decelerate.

One of the advantages of the aircraft 10 is its capability to tilt downwardly for acceleration to a selected steady state velocity along any given flight path, and then tilt upward by an amount sufficient to hold constant velocity along the flight path against the decelerating influence of drag forces, and then, if desired, to tilt in the opposite direction to decelerate into a hovering condition.

As can be apreciated from the foregoing, the invention is susceptible of numerous modifications and variations that will become obvious to the skilled artisan.

What is claimed is:

1. In an aircraft, an upright cabin body having an exterior surface configuration generally symmetrical with respect to an upright central axis, a ducted fan propulsion means mounted to the upper end portion of said cabin body and operable to establish a high velocity airstream of limited thickness flowing downwardly along the exterior surface of the cabin body and exiting at the lower end portion thereof to exert thrust forces for propelling the aircraft, a lower annular shroud supported by said cabin body in laterally surrounding, spaced-apart relation to the lower end portion thereof to define therewith an annular duct open at its upper and lower ends and having a circumferentially uniform width at least equal to the thickness of said high velocity airstream to laterally confine and guide the flow thereof, and a plurality of moveable control surface members extending between said lower annular shroud and the cabin body for interaction with the high velocity airstream thus confined to selectively regulate the attitude and direction of movement of the aircraft.

2. An aircraft according to claim 1 wherein said ducted fan propulsion means includes an impeller disposed for rotation relative to said cabin body, and an upper annular shroud disposed in laterally surrounding relation to said impeller and in laterally surrounding, spaced-apart relation to the upper portion of said cabin body surface to define therewith an annular outlet for the discharge of high velocity air to flow along the cabin body surface in a concentrated airstream of limited thickness corresponding to the spacing between said upper shroud and cabin body surface.

3. An aircraft according to claim 2, said control surface members including a first plurality of control surface members extending between said lower annular shroud and cabin body and disposed for rotation relative thereto about respective axes transverse to said central axis, and a second plurality of control surface members connected to said upper annular shroud for limited movement relative thereto into positions of interaction with the flow of air discharged through said outlet to establish a torque counterbalancing the reaction torque imposed upon the cabin body by the rotation of said impeller.

4. An aircraft according to claim 2 including a plurality of helical vanes supported by said cabin body and extending from the exterior surface thereof for interaction with the high velocity airstream flowing therealong to establish a torque imposed upon said cabin body by the rotation of said impeller.

5. An aircraft according to claim 2 including a plurality of trimmer plate members supported by the upper portion of said cabin body and disposed for movement relative thereto into position in which they restrict the air flow through portions of said annular outlet to establish a selected airstream flow distribution around the periphery of the cabin body to corresponding adjust the orientation of the net propulsive thrust force with respect to the aircraft center of gravity.

6. An aircraft according to claim 2 including a ring member connected to the bottom of said cabin body and extending downwardly therefrom in parallel relation to the central axis thereof to guide the flow of said high velocity airstream to exist the lower end portion of said cabin body in directions parallel to said axis.

7. An aircraft according to claim 2, said control surface members including two pairs of control surface members extending between said lower annular shroud and cabin body, the control surface members of each pair being disposed at opposite positions on the cabin body and for rotation relative thereto about a common axis perpendicular to said central axis, with the rotation axis of one pair of said control surface members being generally perpendicular to the rotation axis of the other pair of control surface members.

References Cited
UNITED STATES PATENTS

| | | | |
|---|---|---|---|
| 2,936,972 | 5/1960 | Zinavage | 244—23 |
| 3,108,764 | 10/1963 | Sudrow | 244—23 |
| 3,135,481 | 6/1964 | Sudrow | 244—23 |
| 3,276,723 | 10/1966 | Miller | 244—23 X |
| 3,356,315 | 12/1967 | Kolodziej | 244—7 |

MILTON BUCHLER, Primary Examiner

THOMAS W. BUCKMAN, Assistant Examiner

U.S. Cl. X.R.

244—7